(12) United States Patent
Li et al.

(10) Patent No.: US 11,657,229 B2
(45) Date of Patent: May 23, 2023

(54) USING A JOINT DISTRIBUTIONAL SEMANTIC SYSTEM TO CORRECT REDUNDANT SEMANTIC VERB FRAMES

(71) Applicant: International Business Machines Corporation, Armonk, NY (US)

(72) Inventors: Yunyao Li, San Jose, CA (US); Carlos Fernando Diez Sánchez, Mexico City (MX); Marie Louise Elizabeth van der Plas, San Gwann (MT)

(73) Assignee: International Business Machines Corporation, Armonk, NY (US)

(*) Notice: Subject to any disclaimer, the term of this patent is extended or adjusted under 35 U.S.C. 154(b) by 343 days.

(21) Appl. No.: 16/878,352

(22) Filed: May 19, 2020

(65) Prior Publication Data

US 2021/0365636 A1    Nov. 25, 2021

(51) Int. Cl.
  *G06F 17/00* (2019.01)
  *G06F 40/30* (2020.01)
  (Continued)

(52) U.S. Cl.
  CPC .............. *G06F 40/30* (2020.01); *G06F 17/16* (2013.01); *G06N 5/04* (2013.01); *G06N 20/00* (2019.01)

(58) Field of Classification Search
  CPC ........ G06F 40/30; G06F 17/16; G06F 40/268; G06F 40/253; G06F 40/20; G06F 40/284; G06F 40/211; G06F 40/45; G06F 17/15; G06F 17/10; G06F 17/00; G06F 40/10; G06F 40/40; G06F 40/58; G06N 20/00; G06N 5/02; G06N 7/005; G06N 3/0454; G06N 5/04
  See application file for complete search history.

(56) References Cited

U.S. PATENT DOCUMENTS 7,742,911 B2    6/2010  Chotimongkol et al.
8,527,262 B2    9/2013  Kambhatla et al.
(Continued)

FOREIGN PATENT DOCUMENTS

CN    110196906 A  *  9/2019
WO    201668690 A1    5/2016

OTHER PUBLICATIONS

Akbik et al., "Multilingual Aliasing for Auto-Generating Proposition Banks," Proceedings of the 26th International Conference on Computational Linguistics: Technical Papers, Dec. 2016, pp. 3466-3474.

*Primary Examiner* — Michael Ortiz-Sanchez
(74) *Attorney, Agent, or Firm* — Zilka-Kotab, P.C.

(57) ABSTRACT

A computer-implemented method, according to one embodiment, is for performing review of semantic role labeling resources. The computer-implemented method includes: receiving pairs of automatically projected semantic verb frames, and computing a similarity score for each of the pairs of semantic verb frames. A joint distributional semantic system is trained using the computed similarity scores. Moreover, a determination is made as to whether to merge each pair of the semantic verb frames, by applying the joint distributional semantic system to that pair. In response to determining that a given pair of semantic verb frames should be merged, an indication is provided to a recipient that the given pair of semantic verb frames should be merged.

22 Claims, 12 Drawing Sheets

(51) Int. Cl.
*G06F 17/16* (2006.01)
*G06N 5/04* (2023.01)
*G06N 20/00* (2019.01)

(56) References Cited

U.S. PATENT DOCUMENTS

| | | | |
|---|---|---|---|
| 8,548,805 B2 | 10/2013 | Chotimongkol et al. | |
| 8,583,648 B1 * | 11/2013 | Majkowska | G06F 16/93 |
| | | | 707/737 |
| 9,128,804 B2 | 9/2015 | Gores | |
| 2004/0006466 A1 * | 1/2004 | Zhou | G06F 40/253 |
| | | | 704/251 |
| 2006/0080101 A1 | 4/2006 | Chotimongkol et al. | |
| 2008/0319735 A1 | 12/2008 | Kambhatla et al. | |
| 2009/0177460 A1 * | 7/2009 | Huang | G06F 40/44 |
| | | | 704/2 |
| 2012/0210294 A1 | 8/2012 | Gores | |
| 2013/0085756 A1 | 4/2013 | Chotimongkol et al. | |
| 2013/0204606 A1 * | 8/2013 | Zong | G06F 40/45 |
| | | | 704/8 |
| 2015/0370887 A1 | 12/2015 | Khapra et al. | |
| 2016/0364476 A1 * | 12/2016 | Curin | G06F 40/268 |
| 2017/0212890 A1 * | 7/2017 | Akbik | G06F 40/30 |
| 2018/0218071 A1 | 8/2018 | Donndelinger et al. | |
| 2018/0300317 A1 * | 10/2018 | Bradbury | G06N 3/0454 |
| 2020/0004813 A1 * | 1/2020 | Galitsky | G06F 16/9027 |
| 2020/0210491 A1 * | 7/2020 | Hajic | G06F 40/295 |

* cited by examiner

USING A JOINT DISTRIBUTIONAL SEMANTIC SYSTEM TO CORRECT REDUNDANT SEMANTIC VERB FRAMES

BACKGROUND

The present invention relates to semantic role labeling, and more specifically, this invention relates to using a joint distributional semantic system to review and correct redundant semantic verb frames.

The task of semantic role labelling (SRL) refers to the automatic analysis of the predicate/argument structure of sentences in a given corpus. In other words, SRL includes identifying and labelling the various constituents (e.g., main arguments) of the sentence with semantic labels, indicating the role these constituents play with respect to their predicate (e.g., a verb or noun), thus creating a semantic frame. This form of shallow analysis is thereby able to extract certain information from texts such as "who did what" and "to whom", as well as optional roles and adjuncts, e.g., "how", "when", and "where". SRL is thereby able to capture the semantics of events in terms of the participants and the roles they play based on the predicate in a more stable, consistent manner across syntactically different sentences, as well as between similar verbs.

Recognizing these event structures has proven to be an important aspect of a broad spectrum of natural language processing applications, such as information extraction, summarization, plagiarism detection, question answering, and machine translation, etc.

Conventionally, the main frameworks for annotating corpora which provide an explicit predicate-argument structure for SRL systems have been developed on the basis of English data. Lexical resources similar to the English based frameworks have been created for other languages such as Chinese and Hindi, yet creating SRL resources (both corpora and lexicons) is costly and time-consuming as these conventional procedures rely heavily on human intervention. The high cost associated with performing manual annotations for SRL have caused conventional procedures to experience significant inefficiencies.

Some attempts have been made in the past to generate proposition banks for novel languages by means of annotation projection in parallel corpora, yet these attempts also rely on manual corrections, which ultimately hindered the creation of SRL systems for new target languages.

SUMMARY

A computer-implemented method, according to one embodiment, is for performing review of semantic role labeling resources. The computer-implemented method includes: receiving pairs of automatically projected semantic verb frames, and computing a similarity score for each of the pairs of semantic verb frames. A joint distributional semantic system is trained using the computed similarity scores. Moreover, a determination is made as to whether to merge each pair of the semantic verb frames, by applying the joint distributional semantic system to that pair. In response to determining that a given pair of semantic verb frames should be merged, an indication is provided to a recipient that the given pair of semantic verb frames should be merged.

A computer program product, according to another embodiment, is for performing review of semantic role labeling resources. The computer program product includes a computer readable storage medium having program instructions embodied therewith. Moreover, the program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: receive, by the processor, a new pair of semantic verb frames; and calculate, by the processor, a multilingual similarity score for the new pair of semantic verb frames. A bilingual similarity score is calculated, by the processor, for the new pair of semantic verb frames. A syntactic similarity score is also calculated, by the processor, for the new pair of semantic verb frames. Moreover, a classifier built as a joint distributional semantic system, and the calculated similarity scores are used, by the processor, to determine whether the new pair of semantic verb frames should be merged.

A computer-implemented method, according to another embodiment, includes: given a list of pairs of automatically projected semantic verb frames and their corresponding redundancy labels, for each of the pairs: computing a similarity score. A joint distributional semantic system is trained using the redundancy labels and the computed similarity scores. Moreover, for each given pair of automatically projected semantic verb frames, the joint distributional semantic system is applied to determine whether that pair should be merged. At least some of the pairs of automatically projected semantic verb frames are merged into respective merged frames based on a result of the determination.

Other aspects and embodiments of the present invention will become apparent from the following detailed description, which, when taken in conjunction with the drawings, illustrate by way of example the principles of the invention.

DETAILED DESCRIPTION

Figure 1:
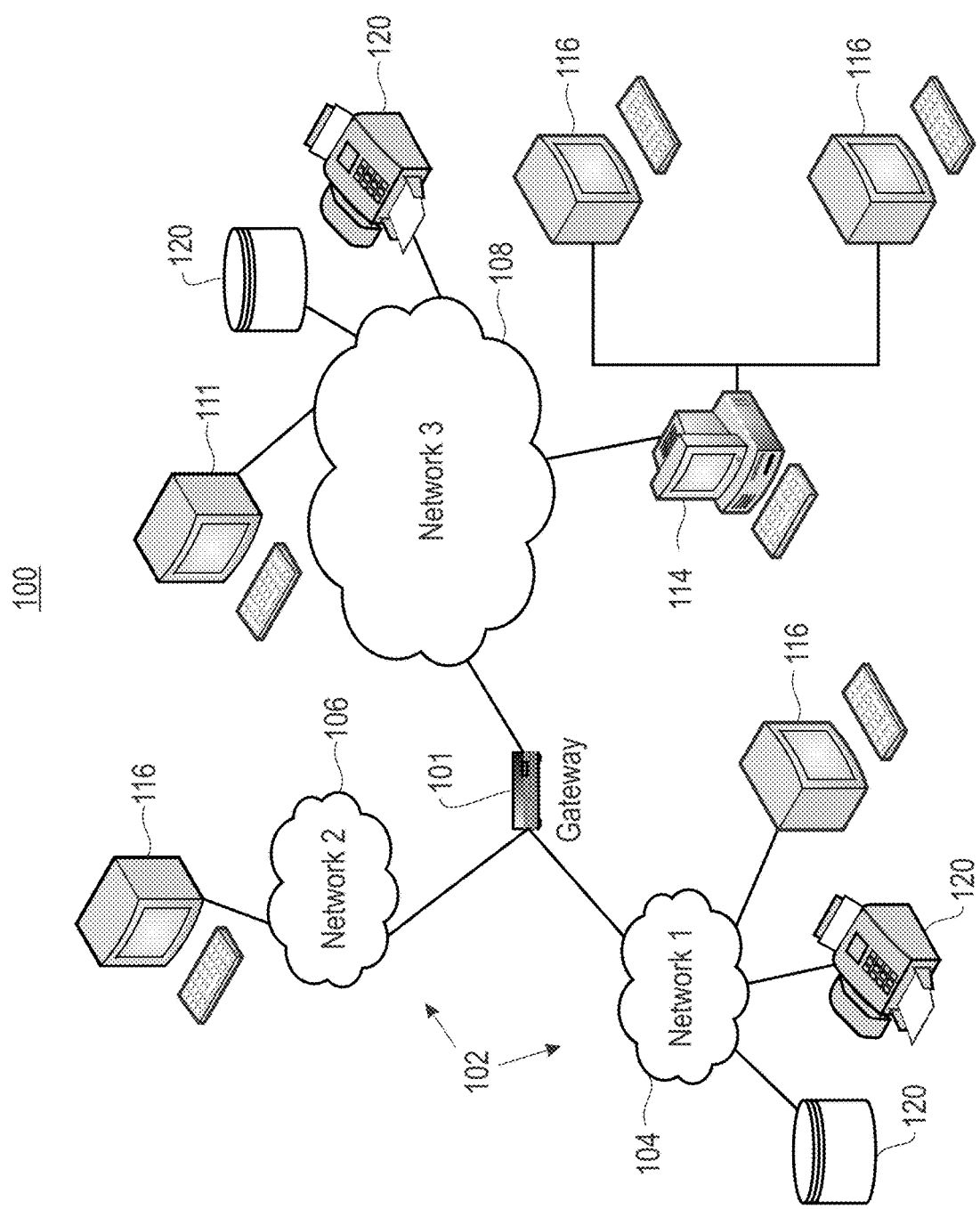
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for automatically identifying potentially redundant semantic verb frames and determining whether or not they should be merged. This is achieved by developing and implementing a joint distributional semantic system in the framework of semantic role labeling, e.g., as will be described in further detail below.

In one general embodiment, a computer-implemented method is for performing review of semantic role labeling resources. The computer-implemented method includes: receiving pairs of automatically projected semantic verb frames, and computing a similarity score for each of the pairs of semantic verb frames. A joint distributional semantic system is trained using the computed similarity scores. Moreover, a determination is made as to whether to merge each pair of the semantic verb frames, by applying the joint distributional semantic system to that pair. In response to determining that a given pair of semantic verb frames should be merged, an indication is provided to a recipient that the given pair of semantic verb frames should be merged.

In another general embodiment, a computer program product is for performing review of semantic role labeling resources. The computer program product includes a computer readable storage medium having program instructions embodied therewith. Moreover, the program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: receive, by the processor, a new pair of semantic verb frames; and calculate, by the processor, a multilingual similarity score for the new pair of semantic verb frames. A bilingual similarity score is calculated, by the processor, for the new pair of semantic verb frames. A syntactic similarity score is also calculated, by the processor, for the new pair of semantic verb frames. Moreover, a classifier built as a joint distributional semantic system, and the calculated similarity scores are used, by the processor, to determine whether the new pair of semantic verb frames should be merged.

In another general embodiment, a computer-implemented method includes: given a list of pairs of automatically projected semantic verb frames and their corresponding redundancy labels, for each of the pairs: computing a similarity score. A joint distributional semantic system is trained using the redundancy labels and the computed similarity scores. Moreover, for each given pair of automatically projected semantic verb frames, the joint distributional semantic system is applied to determine whether that pair should be merged. At least some of the pairs of automatically projected semantic verb frames are merged into respective merged frames based on a result of the determination.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to, a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
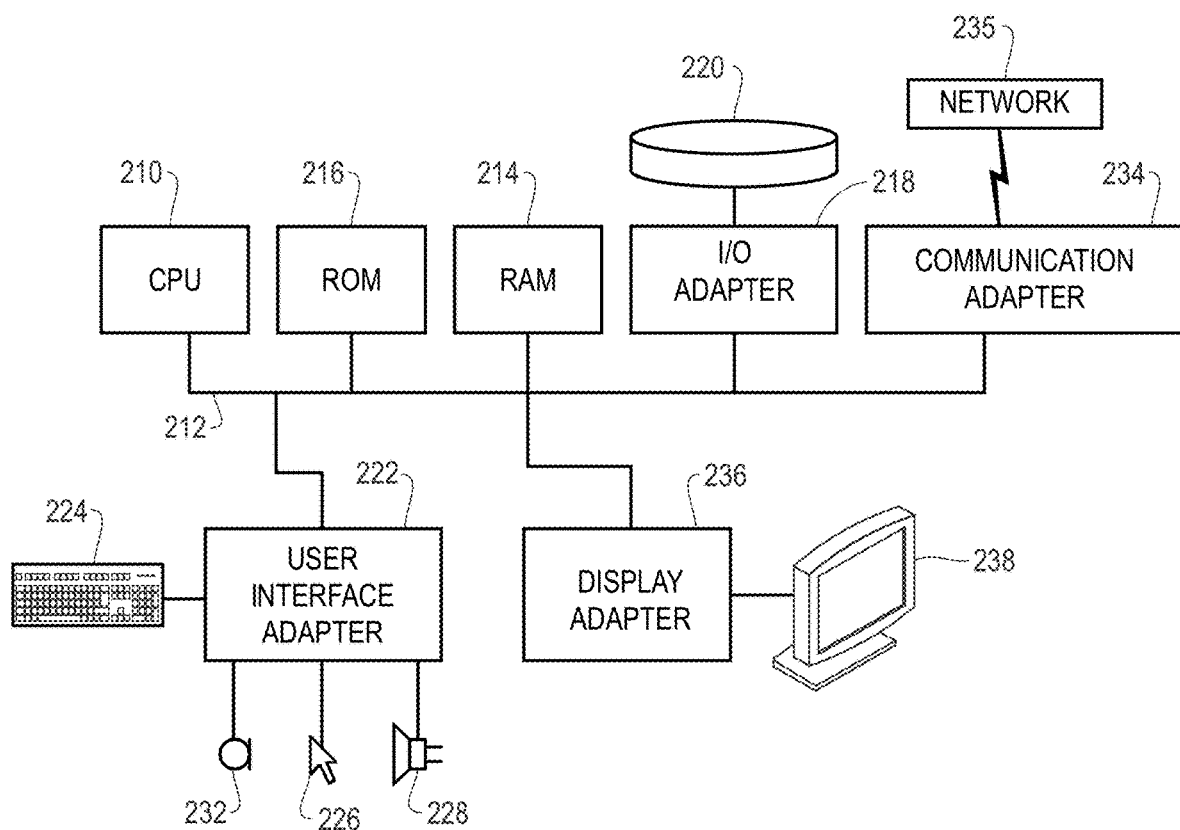
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
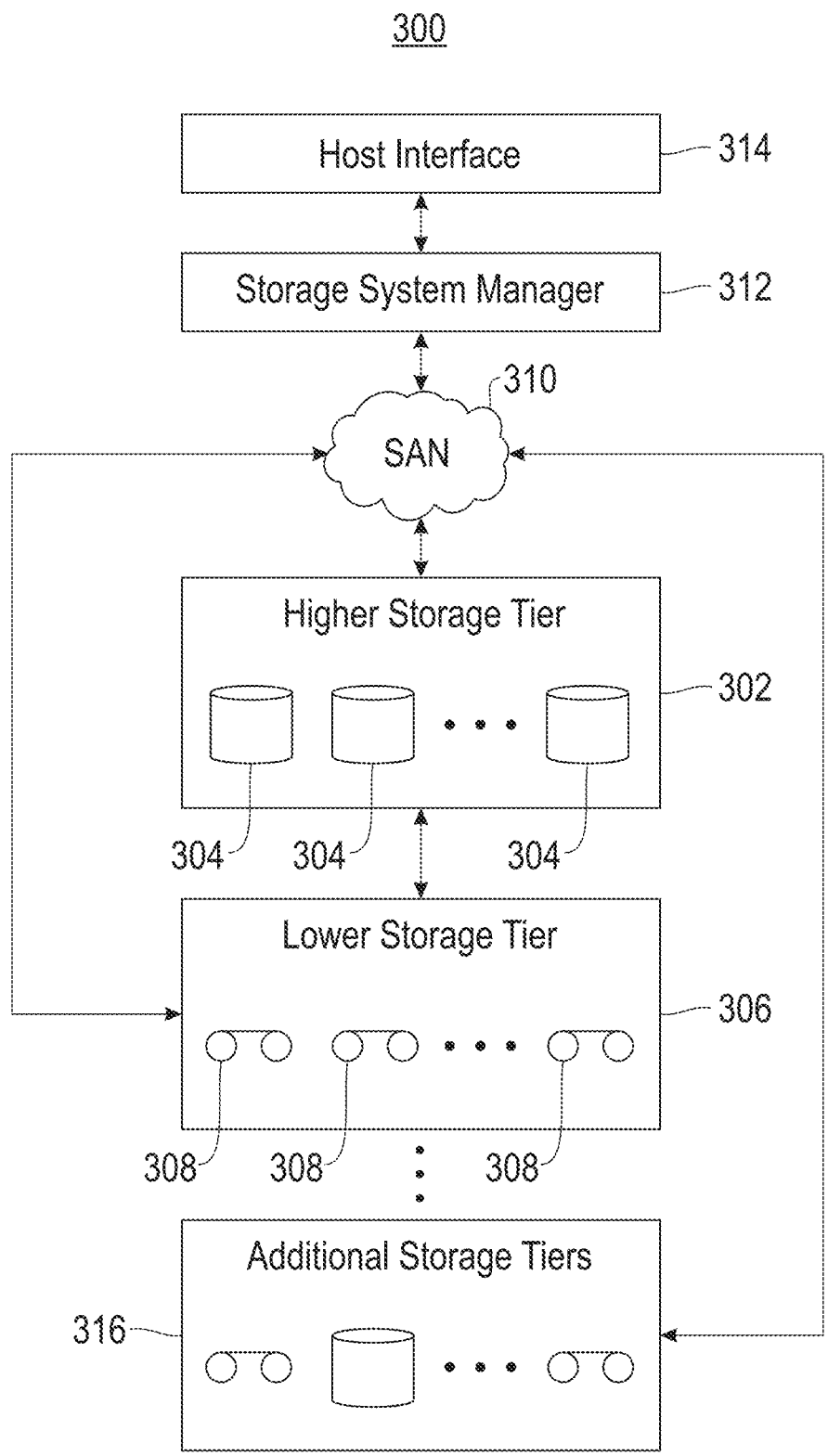
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302 may include a majority of SSD storage media for storing data in a higher performing storage environment, and remaining storage tiers, including lower storage tier 306 and additional storage tiers 316, may include any combination of SSDs, HDDs, tape drives, etc. for storing data in a lower performing storage environment. In this way, more frequently accessed data, data having a higher priority, data that are to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, SRL involves the task of automatically analyzing the predicate-argument structure at the sentence level, and is believed to be an important aspect of developing applications involving natural language understanding. However, due to the high costs associated with performing manual annotations for SRL, there are still a large number of languages for which this kind of corpora do not exist. Again, some attempts have been made in the past to generate proposition banks for novel languages by means of annotation projection in parallel corpora, yet these attempts also rely on manual corrections. The underlying assumption of these procedures is the semantic equivalence of the original and translated sentences, where the semantic labels can be projected onto the aligned target lexical items. However, this assumption results in only a subset of all the semantic labels being correctly projected due to translation shifts and non-literal translations, among other errors and inconsistencies, which also hinder the creation of SRL systems for new target languages.

In sharp contrast to the foregoing shortcomings experienced by previous procedures, various ones of the embodiments included herein achieve an automatic alternative to the conventional manual curation processes. Accordingly, some of the embodiments herein are able to reduce redundancy in automatically projected semantic frames, thereby significantly improving efficiency. These improvements are achieved, at least in part, by making use of distributional semantic models to automatically detect synonymous semantic verb frames. Finally, a joint distributional semantic system may be used to determine whether the automatically projected semantic verb frames in a novel language should be merged (e.g., because they are redundant) or kept separate (e.g., because they represent different semantic verb frames).

It follows that various ones of the embodiments herein achieve a process of detecting redundancy in automatically projected semantic frames using a joint distributional semantic system. Moreover, this may be achieved without labeled data in the target language, as some of the processes included herein may be successfully trained cross-lingually, e.g., as will be described in further detail below.

Figure 4:
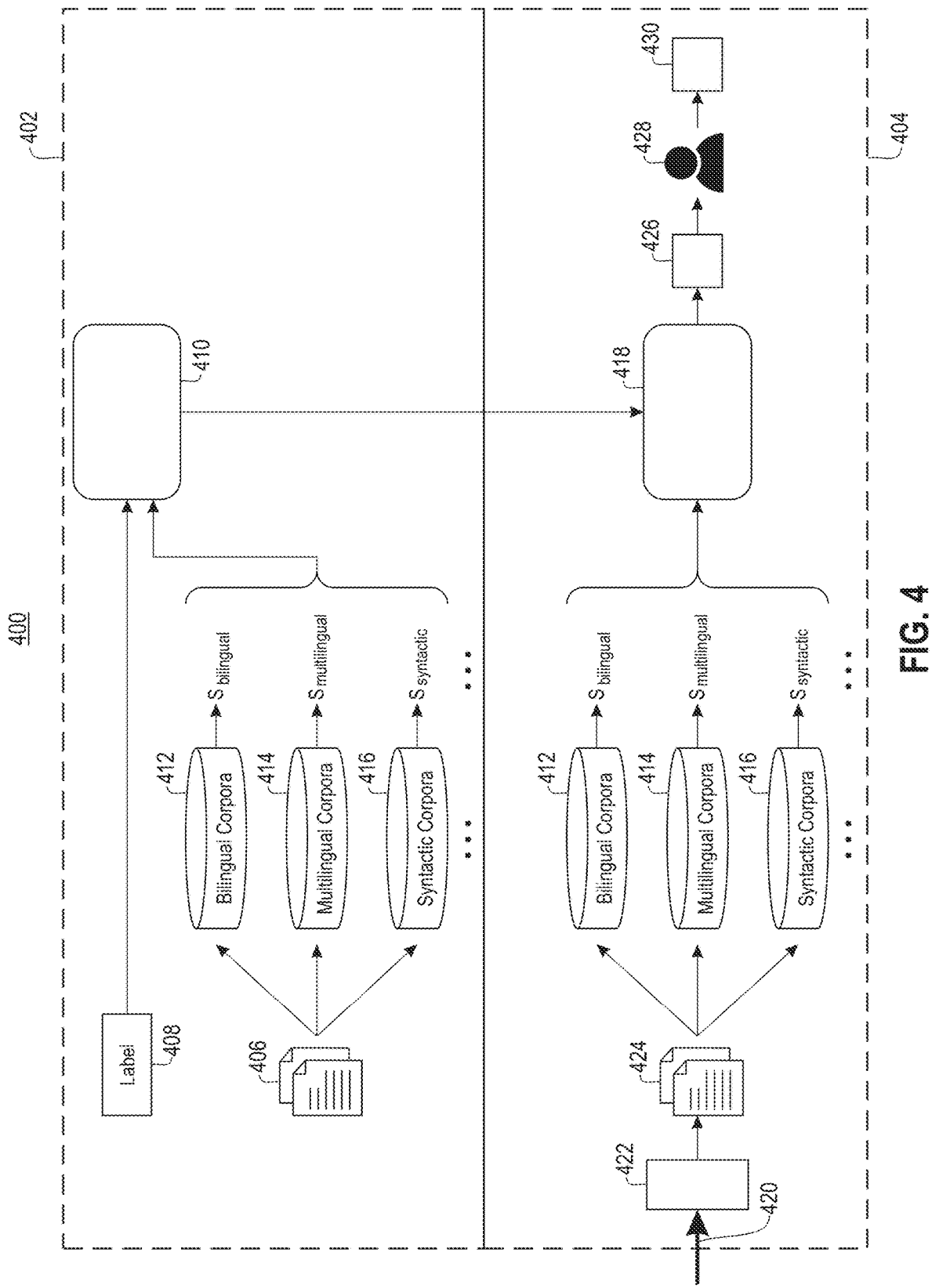
FIG. 4 is a partial representational view of a system, in accordance with one embodiment.

Looking now to FIG. 4, the overview of a system 400 which is able to train and implement a joint distributional semantic system is illustrated in accordance with one embodiment. As an option, the present system 400 may be implemented in conjunction with features from any other embodiment listed herein, such as those described with reference to the other FIGS. However, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) may be deemed to include any possible permutation.

As alluded to above, the system 400 includes a training segment 402 and an application segment 404, each of which may be used in combination with each other. Depending on the particular approach, the training segment 402 and application segment 404 may be implemented in their own respective modules which are able to communicate with each other, in a same computing environment, at different geographical locations, etc. Accordingly, the components and/or process flows illustrated in FIG. 4 are in no way intended to be limiting.

The training segment 402 is utilized to develop a joint distributional semantic system which may then be applied to new (e.g., non-curated) data. This system is trained with a number of known semantic verb frames and corresponding semantic labels, including the so-called framesets, which stand for a set of syntactic frames and correspond to a coarse-grained sense of the verb. With respect to the present description, "known" is intended to signify that the relationship between the semantic verb frames and the projected semantic labels which correspond thereto has already been manually curated. Therefore, redundant semantic frames would be accompanied with the label 'redundant', which indicates they should be merged, whereas non-redundant semantic frames would have the label 'non-redundant' which indicates that the frames should not be merged. It should be noted that these labels are referred to herein as "redundancy labels", because they are intended to indicate whether a given semantic verb frame is redundant (e.g., should be merged) or not (e.g., should not be merged). The relationship that exists between these semantic verb frames and corresponding semantic labels may be gleaned from one or more existing semantic databases. These semantic databases may thereby serve as a body of information which is used to teach the training segment 402 how to interpret different words.

Looking to the training segment 402, a number of known semantic verb frames 406 and known redundancy labels 408 are provided. As noted above, the known semantic verb frames and corresponding redundancy labels 406, 408 may correspond to one or more existing semantic databases. It follows that in some approaches, one or more existing semantic databases may be provided to the training segment 402, while in other approaches the known semantic verb frames 406, their corresponding semantic labels and/or the known redundancy labels 408 may be provided in other ways which would be apparent to one skilled in the art after reading the present description. Thus, by evaluating this known information, the training segment 402 is able to receive new information and through an algorithm over time, evaluate it and process it, as will be described in further detail below (see FIGS. 5A-6B).

With continued reference to the training segment 402, the known redundancy labels 408 are provided to a processing module 410. Accordingly, the processing module 410 may store the known redundancy labels 408 in memory, enter the known redundancy labels 408 into a running algorithm, etc. It should also be noted that the processing module 410 may include any desired controller(s), computing component(s), logical component(s), etc. However, the known redundancy labels 408 correspond to the semantic verb frames 406.

As noted above, the known redundancy labels 408 preferably correspond to respective ones of the known semantic verb frames 406. In other words, each of the semantic verb frames 406 may have a known redundancy label 408 which corresponds thereto. A known semantic label provides information which further defines the respective semantic verb frame and which may be used to perform accurate SRL for a given sentence in which the semantic verb frame is included, e.g., as would be appreciated by one skilled in the art after reading the present description. It follows that the relationship between each of the known redundancy labels 408 and their respective known semantic verb frames 406 is maintained in the processing module 410, e.g., by a lookup table, one or more bits, metadata, etc.

As shown, the known pair of semantic verb frames 406 are used to compute a number of similarity scores before being provided to the processing module 410. The similarity scores may be calculated in some approaches by searching each of the known pair of semantic verb frames 406 in a number of corpora, which correspond to different types of information. For example, each of the known pair of semantic verb frames are searched in a bilingual corpus 412, a multilingual corpus 414, and a syntactic corpus 416. However, it should be noted that additional corpora may be implemented in the training segment 402, e.g., depending on the desired approach.

Searching for verbs from each of the known semantic verb frames in the different corpora allows for the training segment 402 to experiment with various semantic space representations, which are used to form distributional semantic models. For instance, the multilingual corpus 414 is used to create a multilingual distributional model. According to an illustrative approach, a lexical item (e.g., a known verb) can be represented as a high-dimensional vector within a given semantic space representation. These high-dimensional vectors may be formed by using the translational equivalents of the given lexical item obtained from a word-aligned, multilingual parallel corpus, and by counting the number of occurrences of each translational equivalent of the given lexical item.

For example, the semantic frame "cancel" may be identified as being aligned with the verb "cancelar" in a Spanish-English parallel corpus 837 times, and aligned with the verb "stornieren" in a German-English corpus 456 times. These counts may thereby be stored in high-dimensional vectors, which correspond to the semantic frame "cancel". Semantic relatedness for two different lexical items may thereby be assessed by comparing the high-dimensional vectors thereof. If the high-dimensional vectors for the two lexical items are similar (e.g., if the lexical items have similar multilingual semantic distributions), then the two lexical items may be assumed to be similar in meaning.

In addition to utilizing multilingual models, bilingual models which only consider the source—target language pair may be utilized to evaluate two lexical items. For example, an English-Spanish corpus may be used if Spanish serves as the target language. Furthermore, a monolingual syntax-based distributional model may be implemented in order to capture more structured information from the source language of the lexical items. Thus, with continued referring to FIG. 4, the bilingual corpus 412 and syntactic corpus 416 may also be used to determine similarity scores for two lexical items.

The similarity scores $S_{bilingual}$, $S_{multilingual}$, $S_{syntactic}$, which are determined using the bilingual corpus 412, multilingual corpus 414, and syntactic corpus 416 respectively, are also provided to the processing module 410. Accordingly, the processing module 410 may incorporate the similarity scores and/or the associated known semantic verb frames 406 along with the known redundancy labels 408 in the processing module 410. As known semantic verb frames 406 and known redundancy labels 408 are provided to the processing module 410, the processing module 410 is able to generate a joint system through an algorithm over time which defines the relationship between the similarity score between various pairs of known semantic verb frames and their respective redundancy labels. For instance, the processing module 410 may be able to form a joint distributional semantic system which can be used to identify redundant pairs of the same semantic verb frame, thereby avoiding redundancy and ambiguity in the SRL process, e.g., as will be described in further detail below.

Looking now to the application segment 404 of the system 400, the joint distributional semantic system that has been formed by the processing module 410 over time is made available to build a classifier 418. The classifier 418 may thereby use the joint distributional semantic system to evaluate newly received lexical information that has not previously been assessed. For instance, new data 420, which include an automatically created SRL resource for a new language (e.g., SRL lexicon), are received. As noted above, these new data 420 have not yet been curated and therefore the system would benefit from removing redundant semantic verb frames thereon. A plurality of semantic verb frames 422 can be determined using the received new data 420 by applying automatic projection of semantic labels in parallel corpora.

It should be noted that with respect to the term "automatically projected semantic verb frame" as used herein, it is intended to refer to projection of the semantic labels attached to the words that form part of the semantic verb frame in one language onto the words that form part of a corresponding semantic verb frame in another language.

The plurality of automatically projected semantic verb frames 422 are also analyzed in order to detect potentially redundant ones thereof 424. Redundancy among the automatically projected semantic frames 422 in some instances may stem from situations where two of the semantic verb frames 422 were considered to have different properties. For example, one instance of the German verb "ablegen" may have been aligned to the semantic frame of the English verb "take", while another instance of the same verb "ablegen" may have been aligned to the semantic frame of the English verb "put". Whether these two semantic verb frames actually are redundant with respect to each other can be determined based on the similarities found for the two of them in one or more semantic space representations.

Accordingly, once the pairs of potentially redundant semantic verb frames 424 are provided, they are checked against a number of distributional semantic models, which correspond to different types of information. For example, each of the potentially redundant semantic verb frames 424 are checked against a bilingual corpus 412, a multilingual corpus 414, and a syntactic corpus 416. However, it should be noted that additional corpora may be implemented in the application segment 404, e.g., depending on the desired approach. As noted above, checking the lexical items against each of the corpora 412, 414, 416 produces similarity scores $S_{bilingual}$, $S_{multilingual}$, $S_{syntactic}$ which are provided to the classifier 418.

Now, the classifier 418 that uses the joint distributional semantic models to determine the similarity scores for a given pair of possibly redundant semantic verb frames and the known redundancy labels received from the training segment 402 to "learn" how to evaluate newly received lexical information that has not previously been assessed is applied. Accordingly, the classifier 418 evaluates the pairs of potentially redundant semantic verb frames and the corresponding similarity scores $S_{bilingual}$, $S_{multilingual}$, $S_{syntactic}$ in the context of the joint distributional semantic system (e.g., see FIGS. 5A-6B below). Based on this evaluation, the classifier 418 eventually provides an indication 426 of whether the potentially redundant semantic verb frames should be merged. For instance, potentially redundant semantic verb frames which are deemed to be sufficiently similar are preferably merged to avoid any variation in how SRL is performed, while potentially redundant semantic verb frames having redundancy labels which are determined to not be similar are preferably not merged to avoid any loss of detail in the SRL process.

It follows that the indications 426 provided by the classifier 418 are automatically generated. In other words, the application segment 404 of the system 400 is able to apply the information received from the training segment 402 in order to automatically identify redundant semantic verb frames and recommend whether to merge them. However, these indications 426 that are provided by the classifier 418 may optionally be submitted for review. Accordingly, the system 400 includes an optional step of submitting the indications 426 for review, e.g., by a human 428. The human 428 that reviews the indications 426 is preferably able to determine whether merging two potentially redundant semantic verb frames would improve or worsen the performance of SRL systems. Accordingly, in preferred approaches the human 428 is an expert in lexical evaluation.

The result 430 of the optional review process performed by the human 428 is output that may be fed into the training process 402 to improve the classifier 418. Again, while determinations that are made by the application segment 404 may be submitted for review, this manual verification process is optional. Thus, system 400 is able to reduce redundancy in automatically projected semantic frames, thereby significantly improving efficiency, e.g., particularly in comparison to conventional procedures. It should also be noted that although the system 400 was evaluated using semantic verb frames generated by annotation projection, this is in no way intended to be limiting. For instance, the system 400 is able to perform the merging task with any given pair of semantic verb frames, e.g., as would be appreciated by one skilled in the art after reading the present description.

Figure 5A:
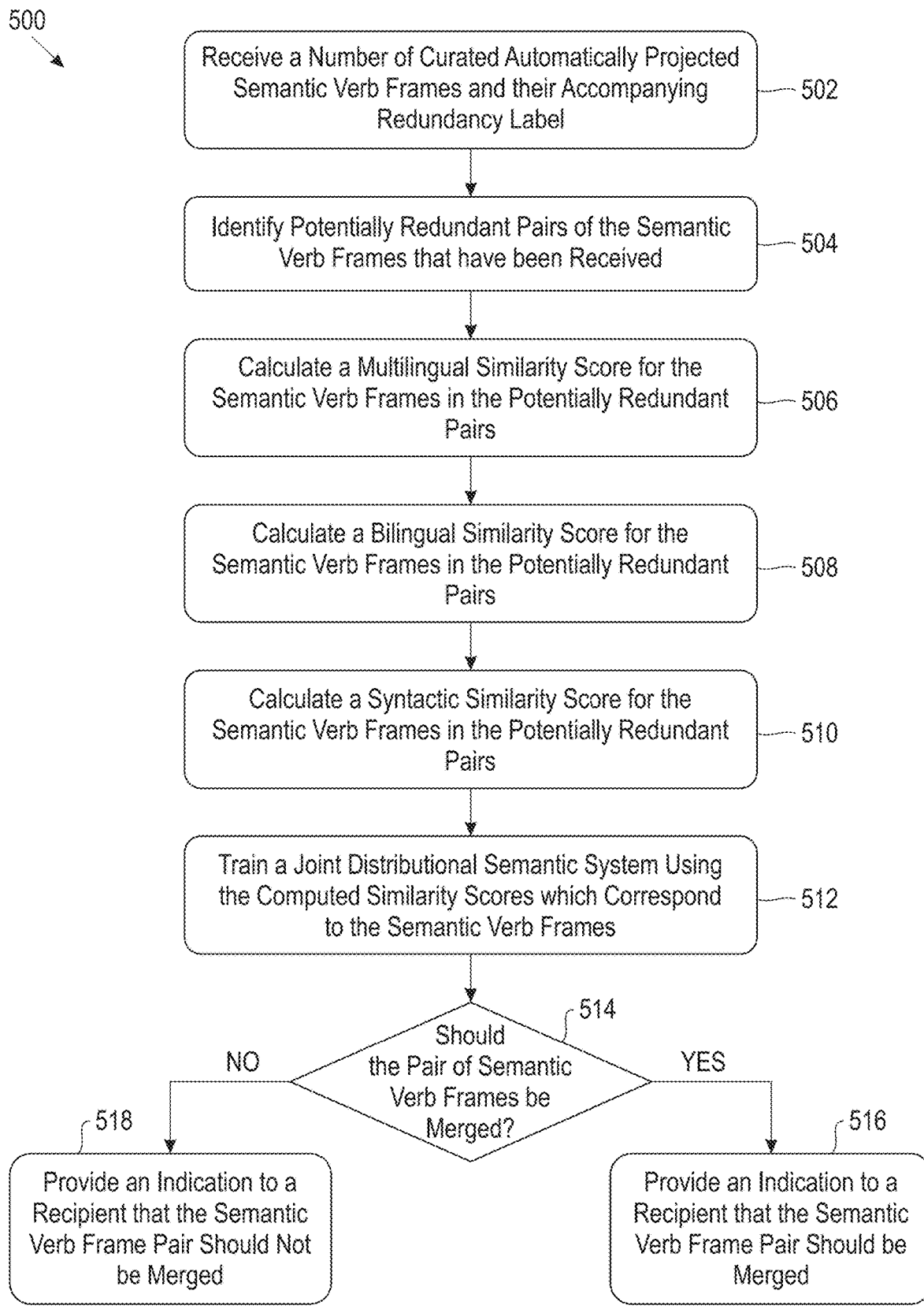
FIG. 5A is a flowchart of a method, in accordance with one embodiment.

Referring now to FIG. 5A, a flowchart of a method 500 for performing the review and correction of semantic role labeling resources using a multilingual aspect is shown according to one embodiment. The method 500 may be performed in accordance with the present invention in any of the environments depicted in FIGS. 1-4, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, one or more of the processes included in method 500 may be performed by an overarching controller positioned in (or at least coupled to) the training segment 402 in the system 400 of FIG. 4. In various embodiments, the method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 includes receiving a number of curated automatically projected semantic verb frames and their accompanying redundancy label. In some approaches, the automatically projected semantic verb frames are received in a list. As mentioned above, method 500 involves performing the review and correction of semantic role labeling resources, but more specifically, method 500 involves developing a joint distributional semantic system. This system is preferably able to automatically identify redundant semantic verb frames and recommend whether to merge them.

This joint distributional semantic system is formed by first evaluating the semantic verb frames and redundancy label received in operation 502. Moreover, these semantic verb frames and corresponding semantic labels may be "known" in the sense that they may correspond to or can be inferred from one or more existing semantic databases. It follows that in some approaches, one or more existing semantic databases may be received. In addition, the redundancy labels received will indicate whether a potentially redundant frame pair should be merged or not. Thus, by evaluating this known information, method 500 is able to train a system over time which can be used to evaluate and process newly received information, e.g., as will soon become apparent.

Operation 504 further includes identifying potentially redundant pairs of the semantic verb frames, based on the redundancy labels that have been received. As noted above, redundant pairs of semantic frames may involve two senses of the same verb, each of which have different semantic labels (so-called frame sets) that are associated therewith. For example, one sense of the verb "abbrechen" (with the semantic label abbrechen.01) may be associated to the semantic frame of the verb "cancel", while another sense of the verb "abbrechen" (with the semantic label abbrechen.02) may be associated to the semantic frame of the verb "terminate." Again, these senses and their semantic verb frames and corresponding semantic labels may be "known" in the sense that they may correspond to or can be inferred from one or more existing semantic databases. All the potentially redundant pairs of the semantic verb frames may be identified by comparing each of the semantic frames to each other sequentially by a process that determines whether they should be merged or not.

In response to identifying at least one potentially redundant pair of the semantic verb frames, a number of similarity scores are calculated in an effort to determine how similar they are. In other words, given a list of pairs of automatically projected semantic verb frames and their corresponding redundancy labels (e.g., which may be received in operation 502), similarity scores are preferably computed for each of the pairs. It should be noted that while method 500 includes calculating a number of different types of similarity scores, this is in no way intended to limit the invention. For instance, in some approaches only one similarity score may be computed for each pair of semantic verb frames, while in other approaches more than three different types of similarity scores may be computed for each pair. As previously mentioned, the similarity scores may be calculated in some approaches by checking them against a number of corpora which correspond to different types of information. For example, each of the semantic verb frames may be checked against a multilingual corpus, a bilingual corpus, and a syntactic corpus. However, it should be noted that any desired type of corpora may be implemented.

Accordingly, operation 506 includes calculating a multilingual similarity score for the potentially redundant pairs of semantic verb frames. In other words, operation 506 includes calculating a value which represents how similar two given semantic verb frames are with respect to a multilingual context. The process of calculating a multilingual similarity score for a pair of semantic verb frames may involve utilizing a multilingual, word-aligned parallel corpus. Checking each of the potentially redundant semantic frame pairs against different corpora allows for various semantic space representations (e.g., distributional semantic models) to be developed. For instance, implementing a multilingual corpus to calculate a multilingual similarity score for the pairs of semantic verb frames allows for a multilingual distributional model to be formed. Again, a lexical item can be represented as high-dimensional vectors in a semantic space representation. These high-dimensional vectors may be formed by finding the translational equivalents of the given lexical item in a word-aligned, multilingual parallel corpus, and by counting the number of occurrences as translations of the given lexical item.

Figure 5B:
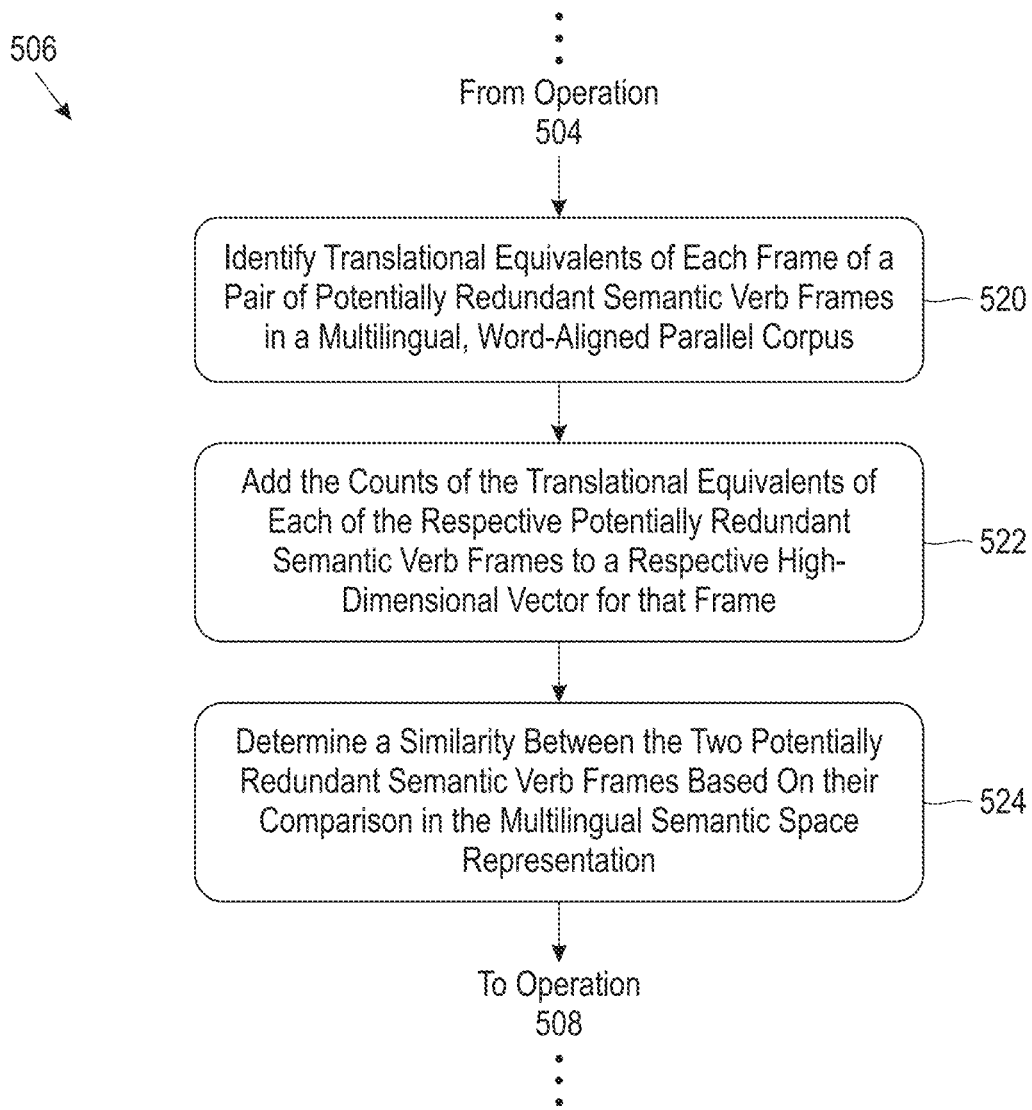
FIG. 5B is a flowchart of sub-processes for one of the operations in the method of FIG. 5A, in accordance with one embodiment.

For instance, referring momentarily to FIG. 5B, exemplary sub-processes of calculating a multilingual similarity score for each pair of potentially redundant semantic frames are illustrated in accordance with one embodiment. Accordingly, one or more of the sub-processes in FIG. 5B may be used to perform operation 506 of FIG. 5A. However, it should be noted that the sub-processes of FIG. 5B are illustrated in accordance with one embodiment which is in no way intended to limit the invention.

As shown, sub-operation 520 includes identifying translational equivalents of each frame of a pair of potentially redundant semantic verb frames in a multilingual, word-aligned parallel corpus. The corpus may include lexical data that correspond to various languages depending on the approach. For instance, the multilingual, word-aligned parallel corpus may include lexical data that correspond to at least five different languages, more preferably at least 10 different languages, still more preferably at least 25 different languages, etc.

According to an example, which is in no way intended to limit the invention, the semantic frame of the verb "quit" may be identified as being aligned with the Spanish verb "dejar" in a Spanish-English parallel corpus 599 times, and aligned with the German verb "verlassen" in a German-English parallel corpus 413 times. These counts may thereby be stored in high-dimensional vectors which correspond to the semantic verb frame "quit". These vectors may ultimately be used to determine how similar the pair of verb frames actually is.

Accordingly, sub-operation 522 includes adding the counts of the translational equivalents of each of the respective potentially redundant semantic verb frames to a respective high-dimensional vector in a semantic space representation for that frame. In other words, sub-operation 522 includes checking the potentially redundant semantic verb frames against their translational equivalents as high-dimensional vectors in a multilingual semantic space representation in some approaches. Moreover, sub-operation 524 includes determining a similarity between the two potentially redundant semantic verb frames based on their comparison in the multilingual semantic space representation. Semantic relatedness for two different lexical items may thereby be assessed by comparing the high-dimensional vectors thereof. If the high-dimensional vectors for the two lexical items are similar, (e.g., if the lexical items have similar multilingual semantic distributions), then the two lexical items may be assumed to be similar in meaning. The similarity between the high-dimensional vectors of the semantic verb frames may be determined differently depending on the approach. For instance, in some approaches determining a similarity between the high-dimensional vectors of the semantic verb frames includes calculating a cosine similarity between the high-dimensional vectors, e.g., see Equation 1 below.

Although the occurrences that are added to the semantic space representation are preferably based on their translational equivalents in a multilingual, word-aligned parallel corpus, the implementation of other types of occurrences is also desired before an overall similarity between the two potentially redundant semantic verb frames is actually determined. For instance, in addition to utilizing multilingual models, bilingual models which only consider the source-target language pair may be utilized to evaluate the similarity between two semantic frames. For example, an English-Spanish corpus may be used if Spanish is the target language. Furthermore, a monolingual syntax-based distributional model may also be implemented in order to capture more structured information from the source language of the semantic frames being compared.

Thus, returning to FIG. 5A, operation 508 includes calculating a bilingual similarity score for the semantic verb frames in the potentially redundant pairs. In other words, operation 508 includes calculating a value which represents how similar two given semantic frames are with respect to a bilingual context. The process of calculating a bilingual similarity score for a pair of semantic frames may involve utilizing a bilingual, word-aligned parallel corpus. As noted above, in order to check the potentially redundant semantic frame pairs, various semantic space representations (e.g., distributional semantic models) need to be developed. For instance, implementing a bilingual corpus to calculate a bilingual similarity score for the semantic verb frames allows for a bilingual distributional model to be formed.

Figure 5C:
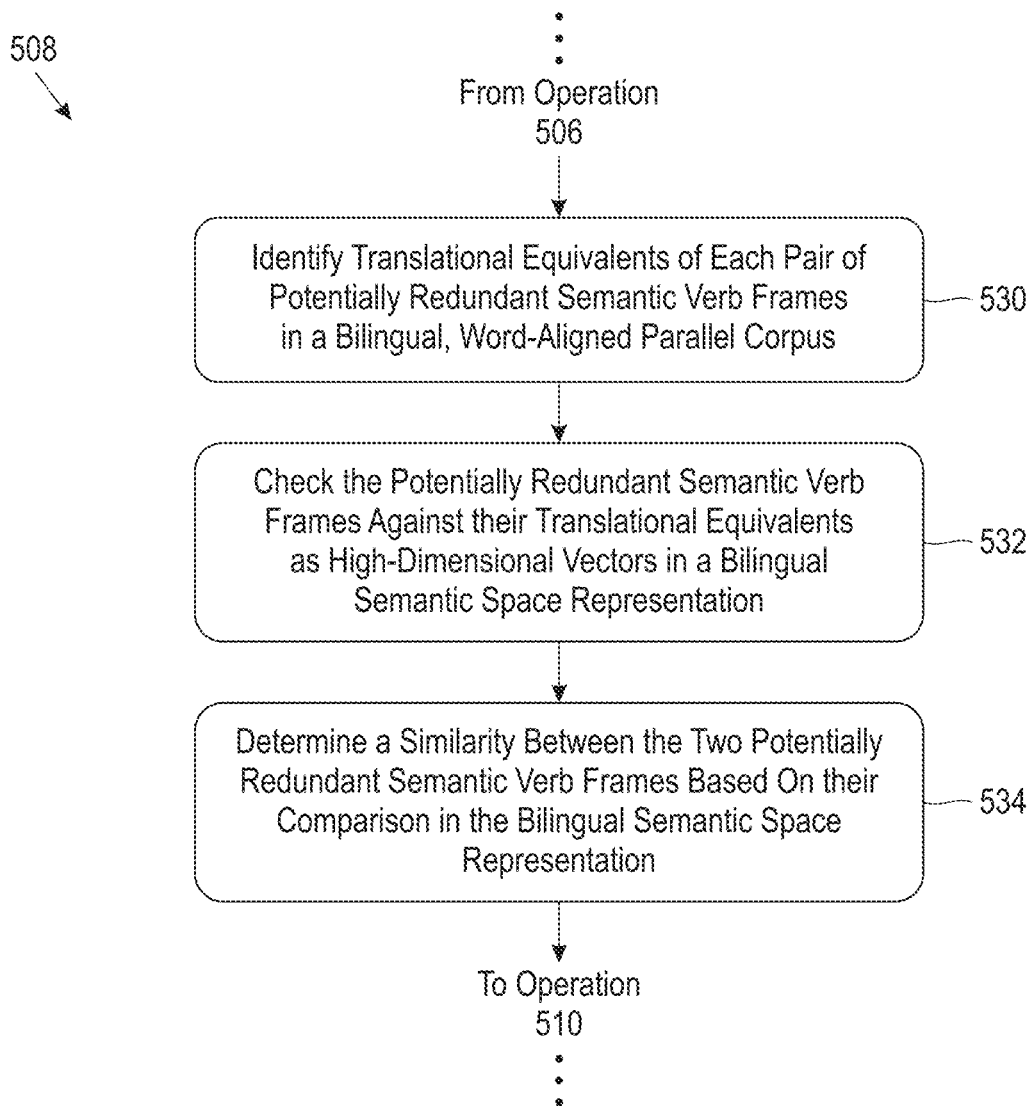
FIG. 5C is a flowchart of sub-processes for one of the operations in the method of FIG. 5A, in accordance with one embodiment.

Again, a lexical item (e.g., a verb) can be represented as high-dimensional vectors in a semantic space representation. These high-dimensional vectors may be formed by finding the translational equivalents of the given lexical item in a word-aligned, bilingual parallel corpus, and by counting the number of occurrences as translations of the given lexical item. For instance, referring momentarily now to FIG. 5C, exemplary sub-processes of calculating a bilingual similarity score for the semantic verb frames in a potentially redundant pair are illustrated in accordance with one embodiment. Accordingly, one or more of the sub-processes in FIG. 5C may be used to perform operation 508 of FIG. 5A. However, it should be noted that the sub-processes of FIG. 5C are illustrated in accordance with one embodiment which is in no way intended to limit the invention.

As shown, sub-operation 530 includes identifying translational equivalents of each of the pairs of potentially redundant semantic verb frames in a bilingual, word-aligned parallel corpus. The corpus may include lexical data that correspond to two distinct languages. In preferred approaches, one of the two languages implemented in the corpus is the target language that is being evaluated. Moreover, sub-operation 532 includes checking the potentially redundant semantic verb frames against their translational equivalents as high-dimensional vectors in a bilingual semantic space representation. In other words, sub-operation 532 includes adding the translational equivalents as high-dimensional vectors in a semantic space representation in some approaches, while sub-operation 534 includes determining a similarity between the two potentially redundant semantic verb frames based on their comparison in the bilingual semantic space representation.

Again, semantic relatedness for two different lexical items may thereby be assessed by comparing the high-dimensional vectors thereof. If the high-dimensional vectors for the two lexical items are similar (e.g., if the lexical items have similar bilingual semantic distributions), then the two lexical items may be assumed to be similar in meaning. The similarity between the high-dimensional vectors of the semantic frames may be determined differently depending on the approach. For instance, in some approaches determining a similarity between the high-dimensional vectors of the semantic frames includes calculating a cosine similarity between the high-dimensional vectors, e.g., see Equation 1 below.

Referring again to FIG. 5A, method 500 proceeds from operation 508 to operation 510. There, operation 510 includes calculating a syntactic similarity score for the semantic verb frames in the potentially redundant pairs. While calculating the multilingual and bilingual similarity scores involves comparing a verb to entries in multilingual parallel corpora which involve at least one language that is different than that of the given verb, calculating the syntactic similarity score for a verb involves a monolingual corpus. In other words, calculating a syntactic similarity score involves utilizing a monolingual syntax-based distributional model in order to capture more structured information from the source language that was projected.

Furthermore, operation 512 includes training a joint distributional semantic system using the computed similarity scores which correspond to the potentially redundant semantic frames. In other words, operation 512 includes forming a joint distributional semantic system using the received redundancy labels and the computed similarity scores. This joint system is formed in some approaches by combining the multilingual similarity scores, the bilingual similarity scores, and the syntactic similarity scores that have been computed along with the redundancy labels that were given as input. Thus, by compiling the different similarity scores for each of the potentially redundant semantic frames, method 500 is desirably able to develop a joint distributional semantic system which may be used to automatically extract information from new (e.g., unknown) lexical data. This joint system may be developed by evaluating a number of known semantic verb frames and corresponding redundancy labels. Any processes which would be apparent to one skilled in the art after reading the present description may be implemented in order to form the joint distributional semantic system using various similarity scores.

The joint distributional semantic system is further used to determine whether to merge various pairs of semantic verb frames. See decision 514. According to preferred approaches, the joint distributional semantic system may be applied to each of the semantic verb frames that were initially received to determine whether that pair should be merged. Yet, in other approaches the joint distributional semantic system may be applied to newly received pairs of semantic verb frames and used to make the determination of whether a given pair should be merged, e.g., as will be described in further detail below.

Method 500 proceeds to operation 516 in response to determining that the pair of semantic verb frames should be merged. There, operation 516 includes providing an indication to a recipient that the semantic frame pair should be merged. In other words, a pair of semantic verb frames that have been identified as being redundant should be merged such that the senses which correspond thereto are consolidated to avoid any confusion. It follows that in response to using the joint distributional semantic system to determine that a given pair of semantic verb frames should be merged, method 500 preferably causes that pair to be merged into a single merged frame. This may be achieved by sending one or more instructions to a storage controller, a lexical management module, saving a result of the determination in memory, updating the joint distributional semantic system, etc., depending on the preferred approach. However, it should be noted that in some instances, a result of the determination that is made as to whether a given semantic verb frame should be merged may be submitted for review. According to an example, which is in no way intended to limit the invention, results of the aforementioned determination may be submitted to a human lexical expert for review before implementation, e.g., as will be described in further detail below.

Referring still to FIG. 5A, method 500 proceeds to operation 518 in response to determining that the pair of semantic verb frames should not be merged. Looking to operation 518, an indication is provided to a recipient that the pair of semantic frames should not be merged. This may be used in some approaches to indicate that the pair of semantic verb frames have been identified as not being redundant with respect to each other. Accordingly, these semantic verb frames should not be merged such that the senses which correspond thereto are each maintained to avoid any loss of detail.

The indications provided in operations 516 and 518 may be sent to a recipient which may include any desired type of location, entity, individual, etc. For example, the indication provided in operation 516 and/or operation 518 may be sent to a user, a running application, a SRL module, a predetermined location in the same process, a different process, another computer, etc., depending on the approach. For example, in some approaches the indications provided in operations 516 and 518 may optionally be sent to a human for manual review, e.g., as will be described in further detail below.

It follows that the various processes included in method 500 are able to automatically identify potentially redundant semantic verb frames and determine whether or not they should be merged. This determination is also achieved automatically (e.g., without intervention) and is based on the comparison of different distributional semantic models and a joint system to take a final decision. Experimental results conducted by the inventors has even demonstrated that various ones of the approaches herein are able to effectively identify redundant semantic verb frames, even in low-resource and/or zero-resource settings.

As previously mentioned, the process of forming a joint distributional semantic system may be performed by an overarching controller positioned in (or at least coupled to) the training segment of a system (e.g., see 402 of FIG. 4 above). After the joint distributional semantic system is formed, it may be used to evaluate new (e.g., unknown) lexical data that have not yet been seen. Accordingly, FIG. 6A includes a method 600 for applying a joint distributional semantic system to unknown lexical data, in accordance with one embodiment. The method 600 may be performed in accordance with the present invention in any of the environments depicted in FIGS. 1-5C, among others, in various embodiments. Of course, more or fewer operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, a computer, etc., or some other device having one or more processors therein. Thus, in some embodiments, method 600 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Figure 6A:
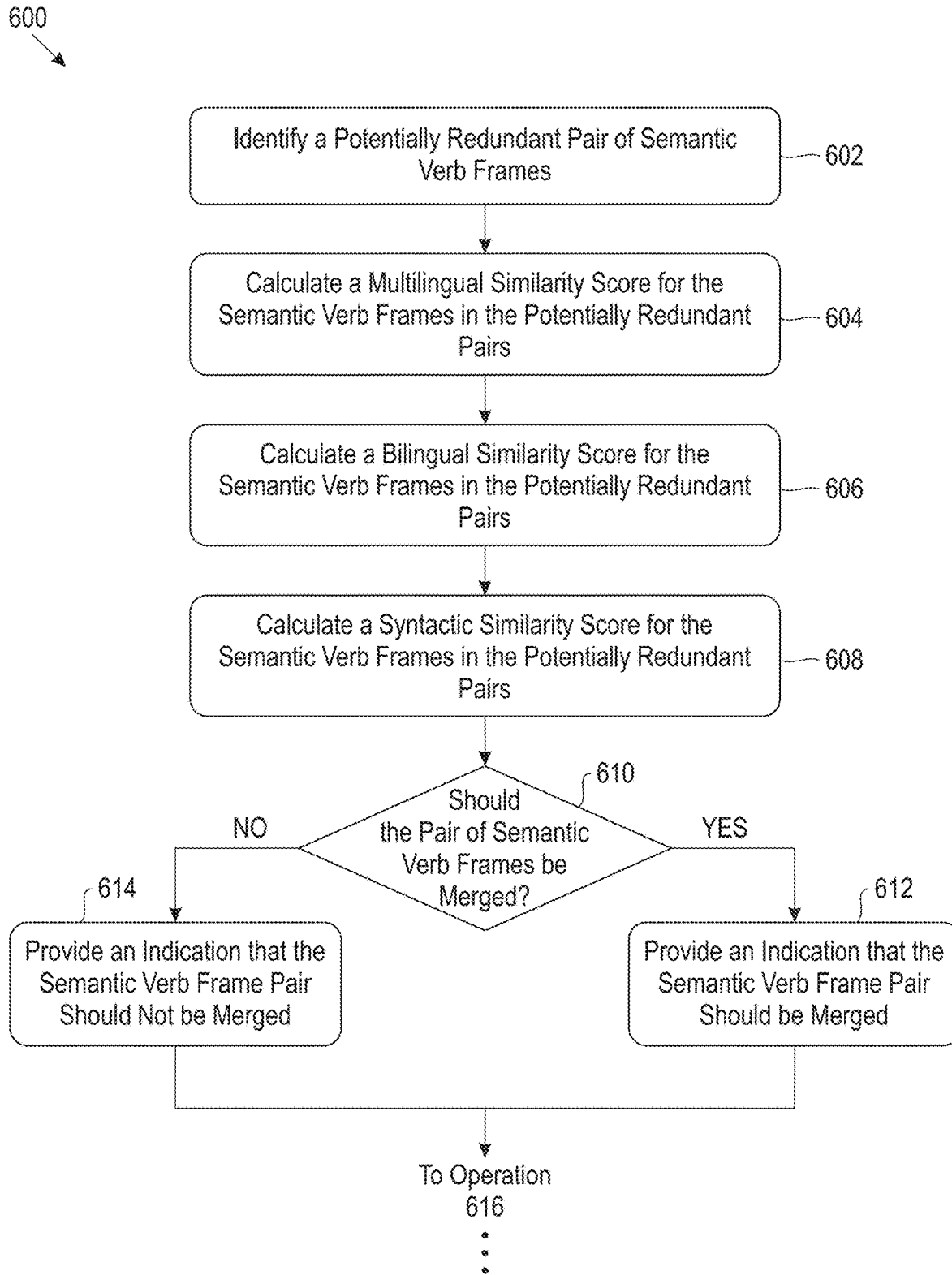
FIG. 6A is a flowchart of a method, in accordance with one embodiment.
Figure 6A:
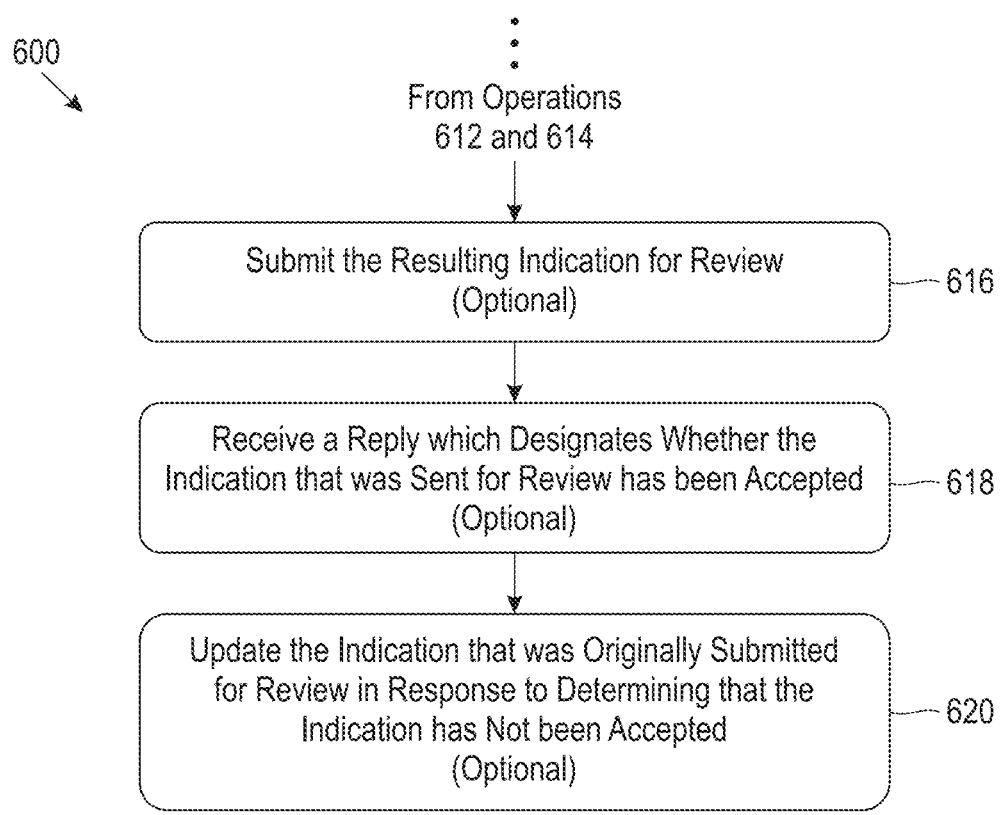
Figure 6B:
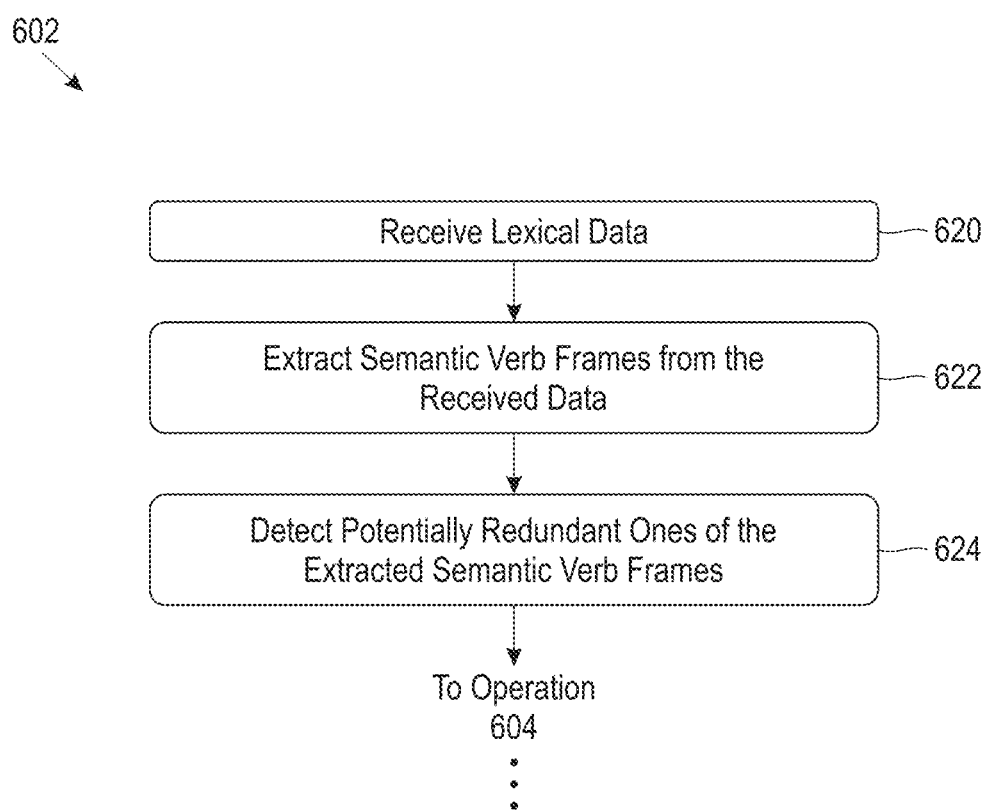
FIG. 6B is a flowchart of sub-processes for one of the operations in the method of FIG. 6A, in accordance with one embodiment.

As shown in FIG. 6A, operation 602 of method 600 includes receiving a number of potentially redundant semantic verb frames. Thus, in some approaches, operation 602 includes receiving a new pair of potentially redundant semantic verb frames. Referring momentarily to FIG. 6B, exemplary sub-processes of identifying a potentially redundant pair of semantic verb frames are illustrated in accordance with one embodiment, one or more of which may be used to perform operation 602 of FIG. 6A in some approaches. However, it should be noted that the sub-processes of FIG. 6B are illustrated in accordance with one embodiment which is in no way intended to limit the invention.

Sub-operation 620 includes receiving lexical data. While the received data preferably include lexical information (e.g., words), the data may be received in any form. For instance, in some approaches the lexical data may be received as searchable words, an image that depicts words, a file which contains data that represent words, etc. Moreover, the lexical data may be received from a user, a running application, a storage system, etc.

Instances of semantic verb frames are thereby formed using the received data. See sub-operation 622. The process of forming semantic verb frames may vary depending on the form in which the lexical data are originally received. However, any procedures for forming semantic verb frames which would be apparent to one skilled in the art after reading the present description may be implemented. Moreover, sub-operation 624 includes detecting potentially redundant ones of the semantic verb frames.

Again, ambiguity may arise from situations where the same semantic verb frames were deemed as different. For example, a situation where a first sense of the German verb "abbrechen" is associated to the semantic frame of the verb "cancel", while another sense of the same verb "abbrechen" has been associated to the semantic frame of the verb "terminate" may lead to ambiguity in a SRL context. Whether or not these semantic frames are deemed to be redundant may depend largely on the similarity (or lack thereof) found in different semantic space representations. It follows that sub-operation 624 may involve comparing each of the semantic verb frames to each other sequentially, organizing the semantic frames such that matches are readily apparent (e.g., arranging them alphabetically), etc.

Referring back now to FIG. 6A, it is desirable that a determination is made as to whether the semantic verb frames in the newly received pair are redundant. In order to do so, a number of similarity scores may be calculated for the semantic verb frames in the newly received pair. Accordingly, operation 604 includes calculating a multilingual similarity score for the semantic verb frames in the potentially redundant pairs. It should be noted that any of the approaches described above may be implemented to perform operation 604. In other words, a multilingual similarity score may be calculated for a given pair of semantic frames by performing any of the processes and/or sub-processes in FIGS. 5A-5B. However, it should be noted that in some approaches a new pair of automatically projected semantic verb frames may be received along with one or more corresponding similarity scores for the new pair. Accordingly, in some instances a multilingual similarity score (and/or a bilingual similarity score and/or a semantic similarity score) may not be calculated for a newly received pair of automatically projected semantic verb frames.

Moreover, operation 606 includes calculating a bilingual similarity score for semantic verb frames in the potentially redundant pair. It should be noted that any of the approaches described above may be implemented to perform operation 606. In other words, a bilingual similarity score may be calculated for a given pair of semantic frames by performing any of the processes and/or sub-processes in FIGS. 5A, 5C.

Further still, operation 608 includes calculating a syntactic similarity score for the semantic verb frames in the potentially redundant pair. It should be noted that any of the approaches described above may be implemented to perform operation 608. In other words, a syntactic similarity score may be calculated for a given pair of semantic frames by performing any of the processes and/or sub-processes in FIG. 5A.

With continued reference to FIG. 6A, a classifier is used to determine whether the newly received pair of semantic verb frames should be merged. See decision 610. This determination is made by the classifier by applying a joint distributional semantic system, using the similarity scores calculated in operations 604, 606, 608. The different calculated similarity scores may be combined to produce a single decision.

In some approaches, determining a similarity between two vectors includes calculating a cosine similarity between those vectors. For example, Equation 1 below may be used to calculate the cosine similarity cos(u,v) between two vectors "u" and "v".

$$\cos(u, v) = \frac{uv}{\|u\|\|v\|} = \frac{\sum_{i=1}^{n} u_i v_i}{\sqrt{\sum_{i=1}^{n} (u_i)^2} \sqrt{\sum_{i=1}^{n} (v_i)^2}} \quad \text{Equation 1}$$

Again, implementing Equation 1 allows for the cosine similarity between two vectors to be calculated. Generally, the raw co-occurrence matrix is manipulated by weighting the co-occurrence counts in order to highlight meaningful word-context associations. Moreover, high-dimensional vectors may be assumed to be the distributional representation of a target word.

A high cosine value (e.g., produced by Equation 1) indicates that the two semantic frames that are being evaluated are closely related and thereby good candidates for merging. For the transformation of the raw co-occurrence counts, the top 10,000 most frequent features may be selected in order to make computations more feasible. Moreover, the default weighting scheme "Y" for two given words "$w_1$" and "$w_2$" may be determined using Equation 2 below.

$$Y(w_1, w_2) = \log_2 \frac{P(w_1, w_2)}{P(w_1)P(w_2)} \quad \text{Equation 2}$$

Here, $P(w_1, w_2)$ represents the probability of both $w_1$ and $w_2$ occurring together, while P(w) is the probability of the occurrence of a single word "w".

Referring again to decision 610, it should be noted that the determination may be made by utilizing a trained classifier (e.g., see 418 of FIG. 4). As previously mentioned, a joint distributional semantic system that has been formed by a processing module over time may be made available to build a classifier. The classifier may thereby use the joint distributional semantic system to evaluate newly received lexical information that has not previously been assessed. For instance, the classifier may use the joint distributional semantic models to determine the similarity scores for a given pair of possibly redundant semantic verb frames and the known redundancy labels received from the training segment to "learn" how to evaluate newly received lexical information that has not previously been assessed is applied. Accordingly, the classifier evaluates the pairs of potentially redundant semantic verb frames and the corresponding similarity scores (e.g., $S_{bilingual}$, $S_{multilingual}$, $S_{syntactic}$) in the context of the joint distributional semantic system. Based on this evaluation, the classifier eventually provides an indication of whether the potentially redundant semantic verb frames should be merged.

From decision 610, method 600 proceeds to operation 612 in response to determining that the potentially redundant pair of semantic verb frames should be merged. There, operation 612 includes providing an indication that the pair of semantic verb frames should be merged. In other words, the pair of semantic verb frames that have been identified as being redundant should be merged to avoid any confusion.

Alternatively, method 600 proceeds to operation 614 in response to determining that the potentially redundant pair of semantic verb frames should not be merged. Looking to operation 614, an indication is provided that the pair of semantic verb frames should not be merged. This indicates that the pair of semantic verb frames have been identified as not being redundant with respect to each other. Accordingly, these semantic verb frames should not be merged to avoid any loss of detail.

The indications provided in operations 612 and 614 may be sent to a user, a running application, a SRL module, etc., depending on the approach. Accordingly, these indications are automatically generated given unknown lexical data. The various approaches described above with respect to method 600 are thereby able to apply a joint distributional semantic system in order to automatically identify redundant semantic verb frames and recommend whether to merge them.

However, in some situations the indications provided in operations 612 and 614 may optionally be submitted for further review. Accordingly, method 600 includes optional processes which stem from both operations 612 and 614. As shown, optional operation 616 includes submitting the resulting indication for review. The review may be performed by a human in some approaches. Accordingly, the human that reviews the indication is preferably able to determine whether merging two potentially redundant semantic frames would improve or worsen the performance of a SRL system. Accordingly, the human may be an expert in lexical evaluation.

Optional operation 618 further includes receiving a reply which designates whether the indication that was sent for review has been accepted. For example, if an indication that the semantic frames should not be merged is submitted for review, the reply may designate whether the semantic frames should in fact be merged, or whether it is more favorable that the semantic frames are maintained as they currently exist. Accordingly, optional operation 620 includes updating the indication that was originally submitted for review in response to determining that the indication has not been accepted. However, the resulting indication that was submitted for review is maintained in its current form in response to determining that it has actually been accepted.

The response received from the optional review process may thereby be used to update indications of whether or not certain semantic frames should be merged. Again, while determinations that are made by the various processes in method 600 may be submitted for review, this manual verification process is optional. Thus, method 600 is able to reduce redundancy in automatically projected verb frames, thereby significantly improving efficiency, e.g., particularly in comparison to conventional procedures.

Figure 7:
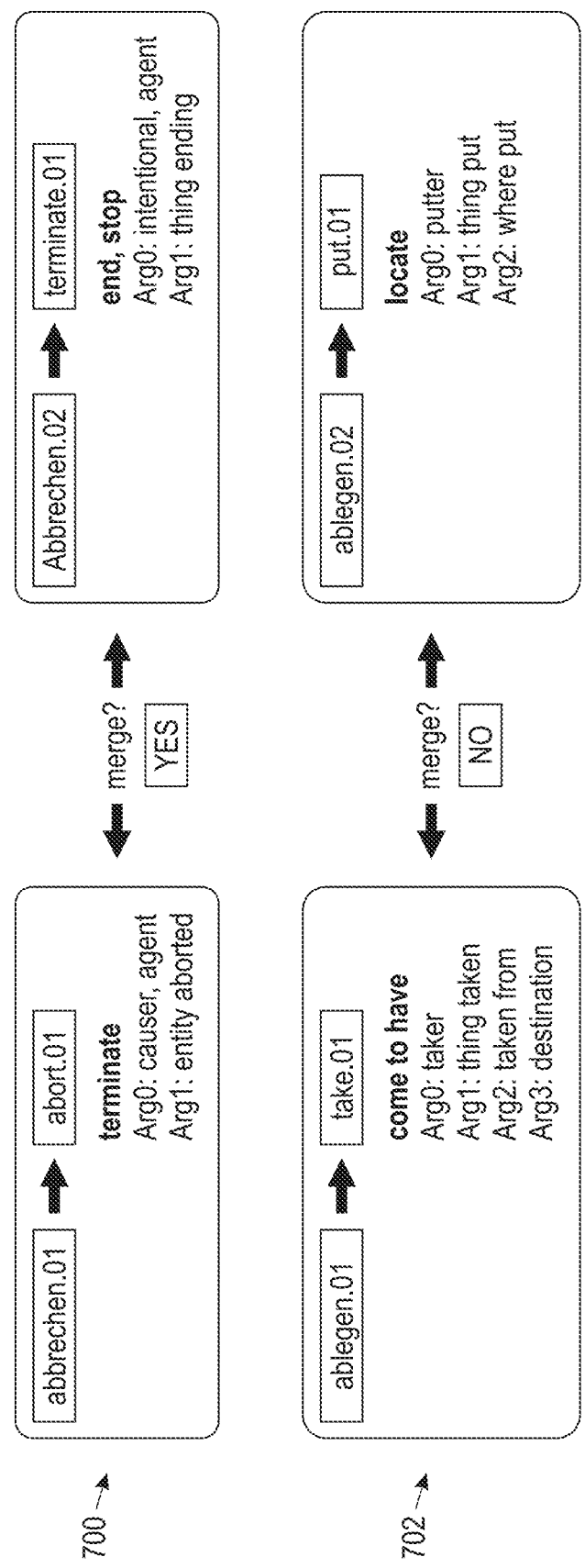
FIG. 7 is an overview of how two pairs of potentially redundant semantic verb frames are evaluated, in accordance with an in-use example.

According to an in-use example, which is in no way intended to limit the invention, FIG. 7 illustrates an overview of how two pairs of potentially redundant semantic verb frames are evaluated. Specifically, the first pair 700 of potentially redundant semantic frames involve the German verb "abbrechen", which is aligned with the semantic frames "cancel" and "terminate" in a German-English parallel corpus. However, the semantic frames which correspond to each sense of the verb "abbrechen" seem similar, and the question therefore arises of whether the two should be merged. Conventional procedures have been unable to automate this determination, yet some of the approaches included herein are able to automatically identify potentially redundant semantic verb frames and determine whether or not they should be merged. This may be achieved by developing and implementing a joint distributional semantic system, e.g., as described herein.

Thus, the joint distributional semantic system may be able to determine the semantic similarity of the two semantic frames "cancel" and "terminate" by comparing the distribution of their individual contexts. If both appear in similar contexts, it may be determined that the corresponding presumed German senses of "abbrechen" should be merged. Otherwise, the German senses of "abbrechen" would not. For instance, the second pair 702 of potentially redundant semantic frames involve two instances of the German verb "ablegen", one of which is aligned with the semantic frame "take" and the other with "put" in a German-English parallel corpus. Following a similar analysis as described above with respect to the first pair 700, a determination may be made that the two presumed verb senses of "ablegen" should not be merged as their respective semantic frames are not sufficiently similar.

Once again, various ones of the approaches herein are able to perform an automatic determination as to the redundancy of the entries in a potentially redundant pair by using distributional similarity. Thus, some of the approaches herein may desirably be adapted for this task in the framework of SRL. This functionality may be achieved by utilizing various semantic space representations (e.g., distributional semantic models). Of particular interest is the implementation of multilingual distributional models as described above. However, bilingual models which take only the source-target language pair into account and monolingual syntax-based distributional models which are able to capture more structured information from the source language are also utilized.

It follows that after a series of analysis operations, three main distributional semantic models may be established with different data. These include a model with bilingual information for each language pair, a model with multilingual information (e.g., 25 languages in total), and a model with syntactic monolingual information. Separate models may also be developed using enriched data, and taking into account a back-translation assumption (BTA). In other words, in addition to extracting source-target (src2trg) alignments, target-source (trg2src) alignments may also be extracted for each verb. The inventors discovered that it not only yields different raw counts but also helps reinforce some verb alignments, an important feature for the main task. As previously mentioned, increased variation is experienced as a result of applying a single distributional model to detect redundancy. Therefore, a number of these distributional models are desirably combined to form a joint distributional semantic system.

Again, this joint distributional semantic system may further be formed in some approaches by training several learning algorithms on the task of automatically merging redundant semantic frames. These learning algorithms are provided with the semantic similarity scores output for various semantic verb frame pairs, as well as the corresponding redundancy labels (e.g., see FIG. 4). Experiments on the development set were performed using logistic regression algorithms, such as additive logistic regression (e.g., based on the principles of additive modeling and maximum likelihood), and logistic model trees (e.g., classification trees with logistic regression functions at the leaves). These particular logistic regression algorithms may be utilized due to the nature of the classification problem, for which the probability of a binary response is estimated based on one or more predictor variables. In the experiments, only the results obtained with logistic model trees may be reported.

Performance of a joint distributional semantic system developed by the various approaches herein has also been evaluated by the inventors in the context of specific examples which are in no way intended to limit the invention. Moreover, this performance was evaluated with respect to obviating semantic frame redundancy. For instance, performance of the joint distributional semantic system was evaluated in a monolingual setting, where both training and test data were derived from the same language. A 10-fold cross-validation process was performed, the average performance of which is depicted in Table 1 below.

TABLE 1

| Training Language | Test | Precision | Recall % | $F_1$ % |
|---|---|---|---|---|
| DE | DE | 79.7 | 88.8 | 84.0 |
| FR | FR | 82.5 | 83.4 | 83.0 |
| ZH | ZH | 89.2 | 94.1 | 91.6 |

As can be seen, the joint distributional semantic system performs consistently well across all three given languages of German (DE), French (FR), and Chinese (ZH) in a monolingual setting. Specifically, precision is shown as ranging from nearly 80% to almost 90%, and recall percentages were from the mid-80% to mid-90%. Moreover, Table 2 below illustrates that the joint distributional semantic system has reduced the number of frames by over 20% for each of the tested languages.

TABLE 2

| Test | Number of Frames (Projected) | Number of Frames (Curated) |
|---|---|---|
| DE | 3478 | 2534 |
| FR | 2023 | 1460 |
| ZH | 1326 | 1044 |

In other words, the joint distributional semantic system can effectively identify redundant semantic verb frames and thereby reduce the number of distinct semantic frames in a completely automatic manner. High recall numbers (e.g., as shown in Table 2) are particularly desirable as they indicate that the joint distributional semantic system can identify most, if not all, the redundant frames.

Situations which involve monolingual evaluation of the joint distributional semantic system, where only 20% of data are available for training, achieve similarly desirable results, e.g., as depicted in Table 3 below.

TABLE 3

| Training Language | Test | Precision | Recall % | $F_1$ % |
|---|---|---|---|---|
| DE | DE | 83.3 | 78.0 | 80.6 |
| FR | FR | 75.5 | 86.4 | 80.6 |
| ZH | ZH | 90.4 | 89.5 | 89.9 |

Figure 8:
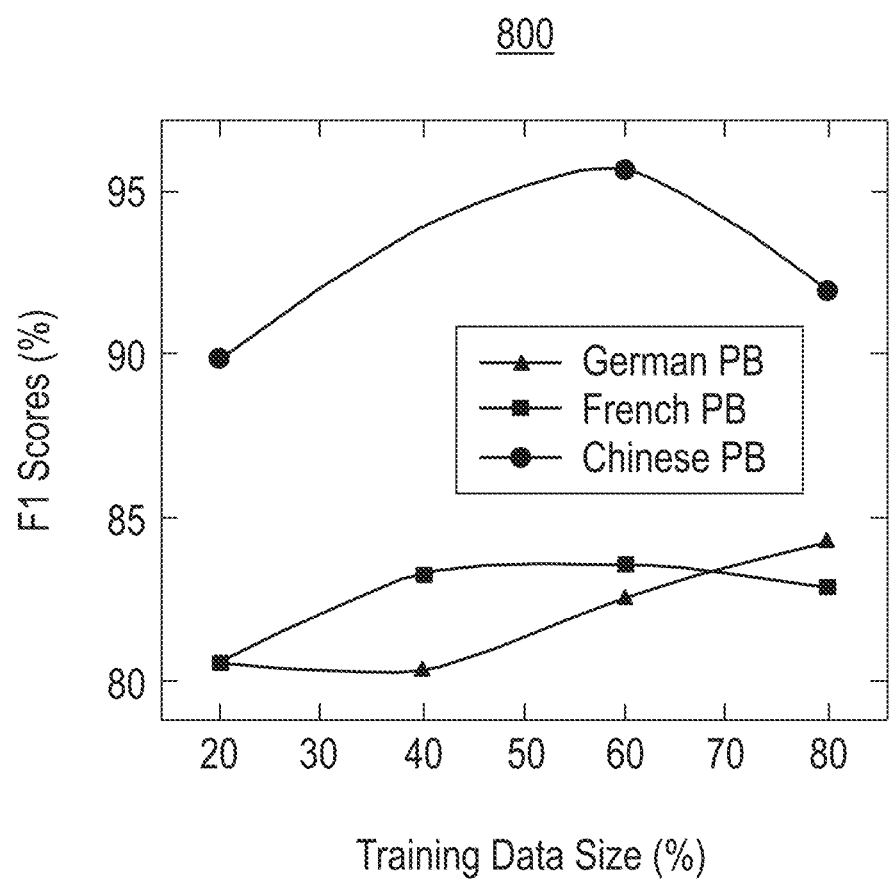
FIG. 8 is a graph of training data size vs. $F_1$ score for a number of different languages, in accordance with one embodiment.

Experiments were also conducted by the inventors to evaluate how robust the joint distributional semantic system is against different training data sizes. This incorporates situations that involve smaller amounts of data annotated with semantic role labels, e.g., as in the case of evaluating a new (e.g., unknown) target language. However, as shown in FIG. 8, the graph 800 illustrates that the joint distributional semantic system performs consistently well across German, French, and Chinese given training data of different sizes, varying from 20% to 80% of the entire semantic-role-labeled data available. The joint system was also able to achieve F1 scores ranging from lower-80% to mid-90%. Accordingly, it is apparent that a larger training data size does not necessarily result in better performance when implementing the joint system. In fact, the joint distributional semantic system performs desirably with merely 20% labeled data for training in the context of all three tested languages, with F1 scores consistently above 80%. Such robustness against training data size indicates that the joint distributional semantic system performs desirably even in low-resource settings, even with only limited monolingual training data available.

However, experimentation performed by the inventors reveals that the joint distributional semantic system performs desirably in multilingual scenarios as well as monolingual settings. It should be noted that multilingual scenarios include situations where data annotated with semantic role labels are available in more than one language, e.g., such that the joint distributional semantic system can be applied in a cross-lingual mode.

For instance, in a zero-source setting, it may be assumed that a sufficiently large amount of semantic-role-labeled data are available in one or more source languages, but no labeled data are available in the target language. Thus, the labeled data in the source language(s) may be used to train a joint distributional semantic system, and then evaluate the performance of the learned model on the target language. The results of implementing this process have been summarized in Table 4 below.

TABLE 4

| Training Language | Test | Precision % | Recall % | $F_1$ % |
|---|---|---|---|---|
| FR | DE | 87.2 | 73.2 | 79.9 |
| ZH |  | 73.4 | 98.3 | 84.1 |
| FR + ZH |  | 83.5 | 82.9 | 83.2 |
| DE | FR | 77.7 | 88.2 | 82.6 |
| ZH |  | 68.5 | 97.8 | 80.6 |
| DE + ZH |  | 76.2 | 91.5 | 83.1 |
| DE | ZH | 91.3 | 84.4 | 87.7 |
| FR |  | 92.9 | 82.7 | 87.5 |
| DE + FR |  | 93.7 | 81.9 | 87.4 |

As shown, the joint distributional semantic system performs consistently well in the cross-lingual setting across all tested languages, similar to what was observed by the joint system as tested in the monolingual setting. Specifically, Table 4 illustrates that for German (DE) and French (FR), the performance achieved by the joint distributional semantic system is comparable to the monolingual settings, e.g., as seen in Table 1.

The joint distributional semantic system has also been evaluated in a cross-lingual setting with 10-fold cross-validation by combining all the semantic-role-labeled data in the three tested languages. As shown in Table 5 below, the joint distributional semantic system performs similarly to the monolingual setting reported earlier in Table 1.

TABLE 5

| Training & Test | Precision % | Recall % | F$_1$ % |
| --- | --- | --- | --- |
| DE + FR + ZH | 84.1 | 84.6 | 84.4 |

The consistent performance of the joint distributional semantic system in both monolingual (including lower-source setting) and multilingual settings (including zero-source setting) as described above confirms the improvements and robustness that is achieved by implementing the various approaches herein.

Once again, various ones of the approaches herein are able to automatically identify potentially redundant semantic verb frames and determine whether or not they should be merged. This determination is also achieved automatically (e.g., without intervention). These achievements are achieved, at least in part, by utilizing multilingual distributional semantics in the framework of semantic role labeling resources. Moreover, the joint distributional semantic system described herein is language independent and therefore can be applied cross-lingually due to the multilingual nature of the created distributional semantic spaces. Thus, the joint distributional semantic system is able to achieve desirable results even when only a small portion of manually annotated data for a novel language is available. Some of the approaches herein thereby serve as a desirable alternative to the conventional manual curation processes which are inefficient and costly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing review of semantic role labeling resources, comprising:
receiving pairs of automatically projected semantic verb frames;
computing a similarity score for each of the pairs of semantic verb frames;
training a joint distributional semantic system using the computed similarity scores;
determining whether to merge each pair of the semantic verb frames, by applying the joint distributional semantic system to that pair; and
in response to determining that a given pair of semantic verb frames should be merged, providing an indication to a recipient that the given pair of semantic verb frames should be merged.

2. The computer-implemented method of claim 1, wherein said computing similarity scores for each of the pairs of semantic verb frames includes:
calculating a multilingual similarity score for each of the pairs of semantic verb frames;
calculating a bilingual similarity score for each of the pairs of semantic verb frames; and
calculating a syntactic similarity score for each of the pairs of semantic verb frames.

3. The computer-implemented method of claim 2, wherein said calculating the multilingual similarity score for one of the pairs of semantic verb frames includes:
identifying translational equivalents of each of the semantic verb frames in the one of the pairs in a multilingual, word-aligned parallel corpus;
adding a count of the translational equivalents of each of the semantic verb frames in the one of the pairs to a respective high-dimensional vector in a semantic space representation; and
determining a similarity between the high-dimensional vectors of each of the semantic verb frames.

4. The computer-implemented method of claim 3, wherein said determining a similarity between the high-dimensional vectors includes calculating a cosine similarity between the high-dimensional vectors.

5. The computer-implemented method of claim 3, wherein the multilingual, word-aligned parallel corpus includes data that corresponds to 25 different languages.

6. The computer-implemented method of claim 2, wherein said calculating the bilingual similarity score for one of the pairs of semantic verb frames includes:
identifying translational equivalents of each of the semantic verb frames in the one of the pairs in a bilingual, word-aligned parallel corpus;
adding a count of the translational equivalents of each of the semantic verb frames in the one of the pairs to a respective high-dimensional vector in a semantic space representation; and
determining a similarity between the high-dimensional vectors of each of the semantic verb frames.

7. The computer-implemented method of claim 1, comprising:
receiving a new pair of automatically projected semantic verb frames, wherein each of the semantic verb frames in the new pair includes a corresponding semantic similarity score for its corresponding pair;
using a classifier as the joint distributional semantic system to determine whether to merge the new pair of semantic verb frames; and

27 in response to determining that the new pair of semantic verb frames should be merged, providing an indication to the recipient that the new pair of semantic verb frames should be merged.

8. The computer-implemented method of claim 7, comprising:
submitting the indication for review;
receiving a reply which designates whether the indication has been accepted; and
in response to the reply, updating the indication to reflect that the new pair of semantic verb frames should not be merged.

9. A computer program product for performing review of semantic role labeling resources, the computer program product comprising a computer readable storage medium having program instructions embodied therewith, the program instructions readable and/or executable by a processor to cause the processor to:
receive, by the processor, pairs of automatically projected semantic verb frames;
compute, by the processor, a similarity score for each of the pairs of semantic verb frames;
train, by the processor, a joint distributional semantic system using the computed similarity scores;
determine, by the processor, whether to merge each pair of the semantic verb frames, by applying the joint distributional semantic system to that pair; and
in response to determining that a given pair of semantic verb frames should be merged, provide, by the processor, an indication to a recipient that the given pair of semantic verb frames should be merged.

10. The computer program product of claim 9, wherein said computing similarity scores for each of the pairs of semantic verb frames includes:
calculating a multilingual similarity score for each of the pairs of semantic verb frames;
calculating a bilingual similarity score for each of the pairs of semantic verb frames; and
calculating a syntactic similarity score for each of the pairs of semantic verb frames.

11. The computer program product of claim 10, wherein said calculating the multilingual similarity score for one of the pairs of semantic verb frames includes:
identifying translational equivalents of each of the semantic verb frames in the one of the pairs in a multilingual, word-aligned parallel corpus;
adding a count of the translational equivalents of each of the semantic verb frames in the one of the pairs to a respective high-dimensional vector in a semantic space representation; and
determining a similarity between the high-dimensional vectors of each of the semantic verb frames.

12. The computer program product of claim 11, wherein said determining a similarity between semantic verb frames includes calculating a cosine similarity between the high-dimensional vectors.

13. The computer program product of claim 11, wherein the multilingual, word-aligned parallel corpus includes data that corresponds to 25 different languages.

14. The computer program product of claim 10, wherein said calculating the bilingual similarity score for one of the pairs of semantic verb frames includes:
identifying translational equivalents of each of the semantic verb frames in the one of the pairs in a bilingual, word-aligned parallel corpus;

28 adding a count of the translational equivalents of each of the semantic verb frames in the one of the pairs to a respective high-dimensional vector in a semantic space representation; and
determining a similarity between the high-dimensional vectors of each of the semantic verb frames.

15. The computer program product of claim 9, wherein the program instructions are readable and/or executable by the processor to cause the processor to:
receive, by the processor, a new pair of semantic verb frames, wherein each of the semantic verb frames in the new pair includes a corresponding semantic similarity score for its corresponding pair;
use, by the processor, a classifier in the joint distributional semantic system to determine whether to merge the new pair of semantic verb frames; and
in response to determining that the new pair of semantic verb frames should be merged, provide, by the processor, an indication to the recipient that the new pair of semantic verb frames should be merged.

16. The computer program product of claim 15, wherein the program instructions are readable and/or executable by the processor to cause the processor to:
submit, by the processor, the indication for review;
receive, by the processor, a reply which designates whether the indication has been accepted; and
in response to the reply, update, by the processor, the indication to reflect that the new pair of semantic verb frames should not be merged.

17. A system, comprising:
a processor; and
logic integrated with the processor, executable by the processor, or integrated with and executable by the processor, the logic being configured to:
receive, by the processor, a new pair of semantic verb frames;
calculate, by the processor, a multilingual similarity score for the new pair of semantic verb frames;
calculate, by the processor, a bilingual similarity score for the new pair of semantic verb frames;
calculate, by the processor, a syntactic similarity score for the new pair of semantic verb frames;
combine, by the processor, the calculated similarity scores; and
use, by the processor, a classifier built as a joint distributional semantic system, and the combined calculated similarity scores, to determine whether the new pair of semantic verb frames should be merged.

18. The system of claim 17, the logic being configured to:
in response to determining that the new pair of semantic verb frames should be merged, provide, by the processor, an indication to a recipient that the new pair of semantic verb frames should be merged;
submit, by the processor, the indication for review;
receive, by the processor, a reply which designates whether the indication has been accepted; and
in response to the reply, update, by the processor, the indication to reflect that the new pair of semantic verb frames should not be merged,
wherein the determination whether the new pair of semantic verb frames should be merged is made based on a single decision.

19. The system of claim 17, wherein said calculating the multilingual similarity score for the new pair of semantic verb frames includes:

identifying translational equivalents of each of the semantic verb frames in the new pair in a multilingual, word-aligned parallel corpus;

adding a count of the translational equivalents of each of the semantic verb frames in the new pair to a respective high-dimensional vector in a semantic space representation; and determining a similarity between the high-dimensional vectors of each of the semantic verb frames in the new pair, wherein the multilingual, word-aligned parallel corpus includes data that corresponds to 25 different languages.

20. The system of claim 19, wherein said determining a similarity between the high-dimensional vectors of the semantic verb frames includes calculating a cosine similarity between the high-dimensional vectors.

21. A computer-implemented method, comprising:

given a list of pairs of first automatically projected semantic verb frames and redundancy labels associated with the first automatically projected semantic verb frames, for each of the pairs of first automatically projected semantic verb frames: computing a similarity score;

training a joint distributional semantic system using the redundancy labels and the computed similarity scores;

receiving pairs of second automatically projected semantic verb frames;

applying the trained joint distributional semantic system to the pairs of the second automatically projected semantic verb frames; and merging at least some of the pairs of the second automatically projected semantic verb frames, based on results of applying the joint distributional semantic system.

22. The computer-implemented method of claim 21, wherein said merging is conditional on an approval of a human expert, wherein each of the redundancy labels indicate whether or not to merge a potentially redundant pair of the first automatically projected semantic verb frames.

* * * * *